US008095801B2

(12) United States Patent
Miller et al.

(10) Patent No.: US 8,095,801 B2
(45) Date of Patent: Jan. 10, 2012

(54) METHOD OF PROTECTING MICROCOMPUTER SYSTEM AGAINST MANIPULATION OF DATA STORED IN A MEMORY ASSEMBLY OF THE MICROCOMPUTER SYSTEM

(75) Inventors: Norbert Miller, Stuttgart (DE); Juergen Pischke, Weissach (DE); Oliver Feilen, Rohrbach (DE); Norbert Loechel, Grafenau (DE)

(73) Assignee: Robert Bosch GmbH, Stuttgart (DE)

( * ) Notice: Subject to any disclaimer, the term of this patent is extended or adjusted under 35 U.S.C. 154(b) by 2011 days.

(21) Appl. No.: 10/188,383

(22) Filed: Jul. 2, 2002

(65) Prior Publication Data

US 2003/0028794 A1 Feb. 6, 2003

(30) Foreign Application Priority Data

Jul. 2, 2001 (DE) .................................. 101 31 575

(51) Int. Cl.
*G06F 12/14* (2006.01)
(52) U.S. Cl. ........................................................ 713/193
(58) Field of Classification Search ..................... None
See application file for complete search history.

(56) References Cited

U.S. PATENT DOCUMENTS

| 5,643,086 | A | * | 7/1997 | Alcorn et al. ................... 463/29 |
| 5,802,592 | A | | 9/1998 | Chess et al. |
| 5,978,475 | A | | 11/1999 | Schneier et al. |
| 6,026,293 | A | * | 2/2000 | Osborn ......................... 455/411 |
| 6,401,208 | B2 | * | 6/2002 | Davis et al. .................... 713/193 |
| 2002/0023223 | A1 | * | 2/2002 | Schmidt et al. ............... 713/187 |

FOREIGN PATENT DOCUMENTS

| EP | 0 940 945 | 9/1999 |
| EP | 1 030 237 | 8/2000 |
| EP | 707 270 | 11/2001 |
| WO | WO 00/48063 | 8/2000 |

OTHER PUBLICATIONS

Deering, Brian: "Data Validation Using the Md5 Hash," http://www.forensics-intl.com/art12.html, Jun. 15, 2001.

* cited by examiner

*Primary Examiner* — David Pearson
(74) *Attorney, Agent, or Firm* — Kenyon & Kenyon LLP

(57) ABSTRACT

A method of protecting a microcomputer system against manipulation of data stored in a memory assembly of the microcomputer system is provided. The method may protect, for example, a control program stored in the memory assembly of a motor vehicle control device. To secure and reliably protect the microcomputer system against manipulation of the data, the data is stored in the memory assembly marked or encrypted using an asymmetrical encryption method. The data may, for example, be encrypted outside the microcomputer system using an encryption algorithm and a private key, which is accessible to only a limited group of persons. The data may be decrypted in the microcomputer system using a decryption algorithm and a freely accessible public key.

15 Claims, 3 Drawing Sheets

METHOD OF PROTECTING MICROCOMPUTER SYSTEM AGAINST MANIPULATION OF DATA STORED IN A MEMORY ASSEMBLY OF THE MICROCOMPUTER SYSTEM

FIELD OF THE INVENTION

The present invention relates to a method of protecting a microcomputer system against manipulation of data stored in a memory assembly of the microcomputer system. The data may be, for example, a program, limiting values, characteristic maps, or parameters.

The present invention further relates to a memory element for a microcomputer system, on which is stored a computer program capable of being executed on a computing device of the microcomputer system, for example, a microprocessor. The memory element may be, for example, a read-only memory, a random access memory, or a flash memory.

The present invention further relates to a computer program capable of being executed on a computing device, for example, a microprocessor.

The present invention also relates to a microcomputer system having a memory element and a computing device, for example, a microprocessor, having a memory assembly, in which data, for example, a program, is stored.

BACKGROUND INFORMATION

Methods are available for preventing unauthorized manipulation of a control program stored in a control device of a motor vehicle or manipulation of parameters or limiting values. The control program may control or regulate specific functions (or units) in the motor vehicle, for example, an internal combustion engine, a driving dynamics regulator, a stop control system (SCS), or an electronic steering system (steer-by-wire). The control program may be stored in a re-writable memory assembly, for example, a flash memory. A manipulation of the control program, the parameters, or the limiting values may cause a defect and/or change in the mode of operation of the controlled or regulated unit. Therefore, manipulation of the control program, parameters, or the limiting values should be prevented, but, if not prevented, the manipulation should at least be capable of detection, so that, for example, the cause of a defect of a controlled or regulated unit may be established or, for example, so that warranty claims may be correctly assigned.

Although unauthorized persons may be able to manipulate the control program, the parameters, or the limiting values, access to the memory assembly of the control device should not be completely forbidden. For example, to perform reprogramming of the control device, an authorized user group should be able to access the memory assembly. Furthermore, it may be necessary to store a new version of a control program or new parameters or limiting values in the control device, for example, to remove errors in the software or to consider new legal requirements.

As referred to in German Published Patent Application No. 197 23 332, a checksum of the content or of part of the content of the re-writable memory should be formed and compared with a reference checksum to check data stored in a re-writable memory of a motor vehicle controller for manipulation. The reference checksum is determined on the basis of data that should be programmed before the control device is programmed, and is stored in the re-writable memory of the control device. If the checksum and the comparison checksum do not match, manipulation of the data is presumed and the control device is blocked for further operation. However, it is believed that this method may not detect all manipulations in a stored control program. In addition, it is believed that this method may be intentionally manipulated in a simple manner, to disable blocking of the control device. Furthermore, control devices, which are manipulated in this manner, may easily be operated with manipulated data, for example, with a manipulated control program.

SUMMARY OF THE INVENTION

An object of the present invention is to more securely and more reliably protect data stored in the memory assembly of a microcomputer, thereby protecting the system against manipulation.

To achieve this object, an exemplary method according to the present invention marks or encrypts the data be transmitted to the memory assembly using an asymmetrical encryption method in conjunction with a new programming or reprogramming of the microcomputer system.

Decryption of the encrypted data transmitted to the memory assembly or checking of the signature of the marked data transmitted to the memory assembly may be performed immediately after the transmission of the data to the microcomputer system and before the data is stored in the memory assembly. Alternatively, however, the encrypted or marked data may be stored in the memory assembly and decrypted or checked before a microprocessor of the microcomputer system processes the data. The aggregate total of all data transmitted to the microcomputer system may be stored, for example, in various memories of the microcomputer system, including the memory assembly.

An exemplary asymmetrical encryption method is the RSA method (named after the method's developers: Rivest, Shamir, Adleman—RSA). This method employs a private key to mark or encrypt the data, the key being accessible only to a limited group of persons, as well as a freely accessible public key for checking the signature or decrypting the data. The private key and the public key are coordinated with each other.

The private key may be accessible, for example, only to the producer of the data, for example, the programmer of the control program. Using the private key, the data is marked or encrypted at a location separate from the microcomputer system, for example, at the location of the producer or programmer, before being transmitted to the memory assembly of the microcomputer system.

The signature is then checked or the data decrypted in the control device on the basis of the public key. It is believed that the public key is suited for use in a microcomputer system, for example, a microcomputer system in motor vehicle control devices, since unauthorized third parties may read the public key from the memory of the microcomputer system. In practice, however, third parties may not use the public key alone, since these parties lack the corresponding private key for the signature or encryption of the data. For example, data encrypted with a different private key may not be decrypted with the public key. Nor, may the signature of data marked with a different private key be successfully checked with the public key.

Thus, an exemplary method according to the present invention maximizes the security and reliability for protecting data stored in a memory assembly of a microcomputer system against manipulation and tuning. The exemplary method may be used, for example, in motor vehicle control devices, to prevent unauthorized third parties from manipulating the control program. However, the method may also be used in other microcomputer systems in various fields of use.

According to another exemplary embodiment of the present invention, the data is marked or encrypted outside of the microcomputer system, using a private key, which is accessible only to a limited group of persons, and of a predefinable encryption algorithm. The encryption algorithm may operate, for example, according to the RSA method.

According to still another exemplary embodiment of the present invention, outside of the microcomputer system, at least part of the data is reduced to a fingerprint using a compression algorithm, a signature is formed from the fingerprint using the private key, and the signature is transmitted with the data to the microcomputer system. The compression algorithm may operate, for example, according to the CRC (cyclic redundancy check) method or, for example, according to the MD5 method. Information about the MD5 method is referred to in the article: "*Data Validation Using the Md5 Hash*" (Jun. 15, 2001), by Brian Deering, to which reference is explicitly made. The signature is then checked in the microcomputer system, and if a manipulation of the data is detected, appropriate measures are implemented, which may include, for example, immediate blocking of the microcomputer system, blocking the microcomputer system at a later time, for example, at the next driving cycle, or operating the microcomputer system in emergency mode.

According to yet another exemplary embodiment of the present invention, the marked or encrypted data is checked or decrypted in the microcomputer system using a freely accessible public key. The public key is stored in a memory of the microcomputer system, for example, a read-only memory, for example, an EEPROM (electronically erasable programmable read only memory). Since an associated private key is kept secret, there is no security risk from having the public key stored in the microcomputer system, even though it may be read.

In still another exemplary embodiment of the present invention, the signature is decrypted in the microcomputer system using the public key to give a decrypted fingerprint, a reference fingerprint is formed from the same part of the data and using the same predefinable compression algorithm as used in forming the signature outside the microcomputer system, and the decrypted fingerprint is compared with the reference fingerprint. Manipulation of the data may be presumed if the decrypted fingerprint and the reference fingerprint do not match.

The marked data or the decryption of the encrypted data may be checked at different times. For example, the marked data or the decryption of the encrypted data may be checked in the microcomputer system, following a new programming or reprogramming of the memory assembly, at which time, no run-time problem exists. Thus, complicated and computing-intensive compression algorithms and encryption algorithms may be used, and the entire content of the memory assembly of the microcomputer system may be checked for manipulation. If the signature is successfully checked or if the data is successfully decrypted, an identifier, for example, a checksum, may be stored in a predefinable memory area of the memory assembly. The content of this memory area may then be queried in a short time, to ascertain whether the data stored in the memory assembly has been manipulated. The content of the predefinable memory area may be checked during processing of the data, for example, while a control program is executing. The content of the memory area may also be checked for the presence of the identifier to be performed while the microcomputer system powers up, for example, in conjunction with a boot routine, or before, during, or after operation of the microcomputer system.

The marked data or the decryption of the encrypted data may be checked in the microcomputer system, while the microcomputer system powers up, for example, in conjunction with a boot routine. To prevent an excessive delay in powering up the microcomputer system, only part of the memory assembly may be checked, rather than the entire memory assembly. Thus, different fingerprints may be determined for the content of different parts of the memory assembly, different signatures may be formed from the fingerprints, and the signatures may be transmitted with the data to the microcomputer system. Thus, each time the microcomputer system powers up, a different part of the memory assembly is checked in the microcomputer system, by decrypting the corresponding signature and comparing the decrypted fingerprint with a corresponding reference fingerprint.

According to still another exemplary embodiment of the present invention, the marked data or the decryption of the encrypted data is checked in the microcomputer system in conjunction with the processing of the data. The check or decryption of the data is performed while the data is being executed. As described above, only part of the content of the memory assembly may be decrypted or checked. The processing and the checking or decryption of the data may employ different processes having different priorities, which are sequentially executed by the microprocessor of the microcomputer system. In the course of sequentially executing the process for checking or decrypting the data, the content of the same part of the memory assembly may be decrypted or checked, or the content of a different part of the memory assembly may be checked or decrypted each time the process is called, so that the content of the entire memory assembly is checked or decrypted, after a relatively long driving cycle. The decryption or checking of the data may be assigned a lower priority than the processing of the data, so that the microprocessor decrypts or checks the data when the processing of the data permits sufficient computing time. If a microcomputer system is designed as a motor vehicle control device, the data may be checked or decrypted during normal operation.

A hash algorithm may be executed as a compression algorithm to form a hash value. The hash algorithm may operate, for example, according to the MD5 method. An RSA method may also be executed as an asymmetrical encryption method.

An exemplary method according to the present invention may be implemented in a memory element provided for a microcomputer system. A computer program capable of performing an exemplary method according to the present invention when executed on a computing device of the microcomputer system is stored on the memory element. In this case, the memory element provided with the computer program executes an exemplary method according to the present invention. An electrical memory medium, for example, a read-only memory, a random access memory or a flash memory, may be used as the memory element.

The memory element may be arranged in a microcomputer system at the location of the producer of the data, for example, at the location of a programmer of the control program. In this case, a computer program for performing an exemplary method according to the present invention is stored on the memory element. The data may be encrypted or marked at the location of the producer of the data during development. The memory element may be located in a microcomputer system designed as a control device, for example, as a motor vehicle control device. In this case, a computer program for performing an exemplary method according to the present invention is stored on the memory element. The data may be decrypted or the signature of the data may be checked in the microcomputer system, which may be designed, for example, as a control device.

An exemplary computer program according to the present invention performs an exemplary method according to the present invention when executed on a computing device, for example, a microprocessor. The computer program may be stored on a memory element, for example, a flash memory. The computer program may execute on a microcomputer system at the location of the producer of the data, to perform an exemplary method according to the present invention. The computer program may also execute on a microcomputer system, which may be designed as a control device.

An object of the present invention may be achieved by a microcomputer system having an arrangement for performing an exemplary method according to the present invention. The microcomputer system may be placed at the location of the producer of the data, or may be designed, for example, as a control device for a motor vehicle. If the microcomputer system has an arrangement for performing an exemplary method according to the present invention, it may be designed as a programming device for new programming or reprogramming of the memory assembly of a control device. If the microcomputer system has an arrangement for performing another exemplary method according to the present invention, it may be designed as the control device.

According to still another exemplary embodiment of the present invention, the arrangement for performing an exemplary method according to the present invention is designed as a computer program capable of executing on the computing device of the microcomputer system.

DETAILED DESCRIPTION

An object of the present invention is to provide a method of protecting a microcomputer system against manipulation of data stored in a memory assembly of the microcomputer system. The microcomputer system may be designed, for example, as a control device for a motor vehicle. The data may be designed, for example, as a control program, as limiting values, characteristic maps or parameter values. In the exemplary method described herein, marked or encrypted data, using an asymmetrical encryption method, is stored in the memory assembly. Before the data is executed or used, the control device verifies the data at certain times and to a certain extent. If the verification fails, execution of the data or the microcomputer system is blocked.

Figure 1:
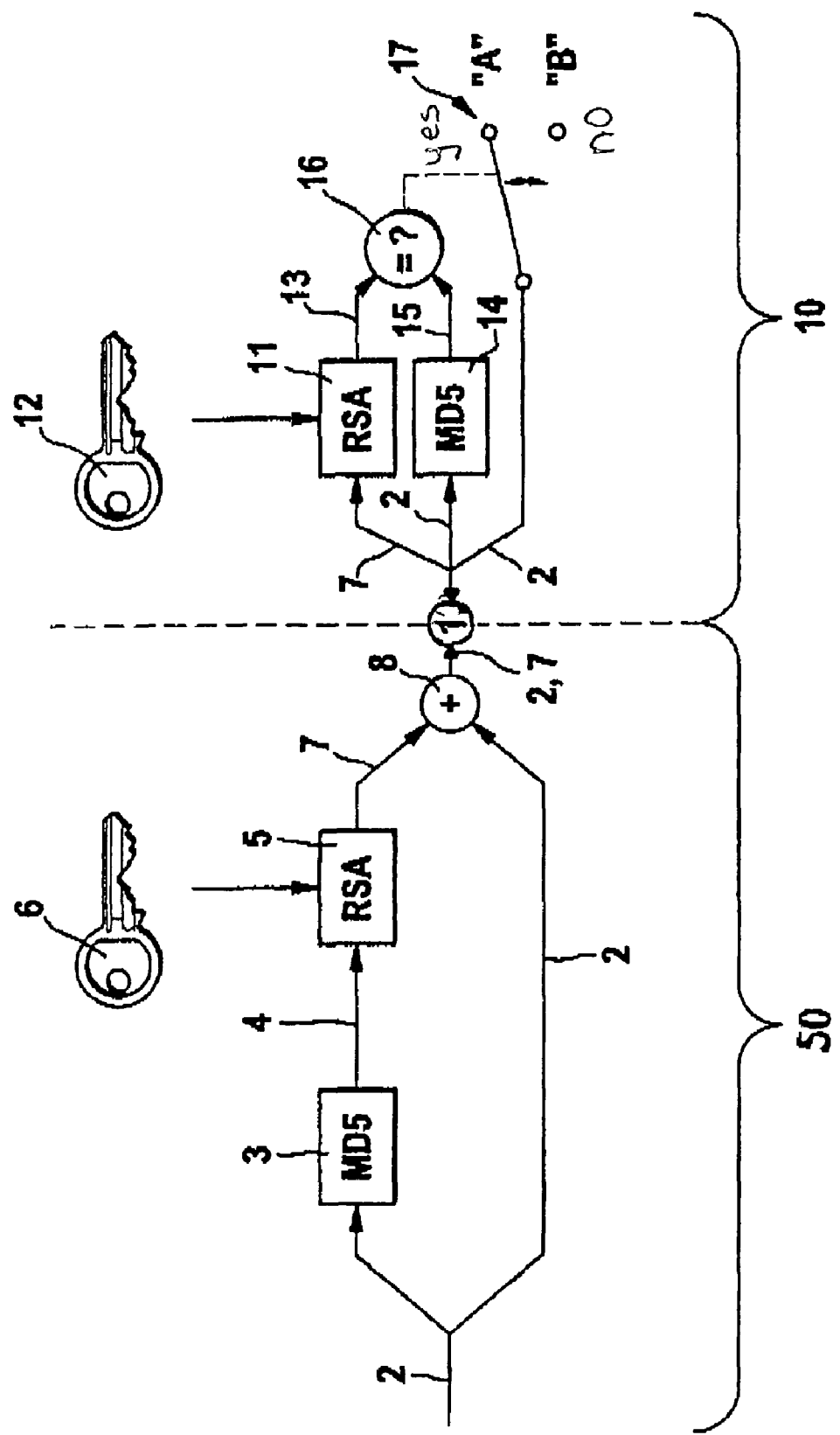
FIG. 1 is a flow chart of an exemplary method according to the present invention.

FIG. 1 is a flow chart of an exemplary method according to the present invention, which is executed in a microcomputer system 50 placed at the location of a producer of data 2, for example, at the location of a programmer of the control program. Data 2 to be programmed, or part of data 2, is marked in microcomputer system 50 during development. In function block 3, data 2 is reduced to a fingerprint 4 on the basis of a compression algorithm. The compression algorithm may be, for example, a hash algorithm, for example, according to the MD5 method. In this case, fingerprint 4 is also referred to as a hash value or MD5 hash value. Fingerprint 4 is encrypted in function block 5 using a predefinable encryption algorithm and a private key 6, which is accessible to only a limited group of persons. The RSA algorithm may be used as the encryption algorithm. The encrypted fingerprint is referred to as signature 7. In function block 8, signature 7 is attached to data 2 and transmitted with the data to a programming device 1.

Programming device 1 may be located, for example, in a motor vehicle workshop and may be used, for example, to newly program or reprogram a microcomputer system 10, which may be designed, for example, as a motor vehicle control device. Data 2 and signature 7 are transmitted from programming device 1 to control device 10.

In control device 10, data 2 is separated from signature 7. In function block 11, signature 7 is decrypted using a decryption algorithm and a freely accessible public key 12, thereby producing decrypted fingerprint 13. An RSA algorithm may be used as the decryption algorithm. The decryption algorithm used in function block 11 should match the encryption algorithm used in function block 5. In function block 14, a reference fingerprint 15 is formed from the same part of data 2 using the same compression algorithm as was used to form the signature 7 in programming device 1. In function block 16, a check is performed to determine whether decrypted fingerprint 13 and reference fingerprint 15 are the same. Depending on the result of this query, a switching element 17 is switched, and data 2 is either processed (position "A") or blocked (position "B"). If it is determined that decrypted fingerprint 13 and reference fingerprint 15 are the same, signature 7 of data 2 was checked successfully, and data 2 (switching element 17 in position "A") may then be processed. Otherwise manipulation of data 2 is presumed, and execution of data 2 is blocked or data 2 is processed in an emergency operating mode (switching element 17 in position "B").

When newly programming or reprogramming control devices 10, protection against manipulation or tuning may be improved using an exemplary method according to the present invention. For example, the manipulation of data 2, which is stored in a memory assembly of control device 10, may be detected securely and reliably.

Figure 2:
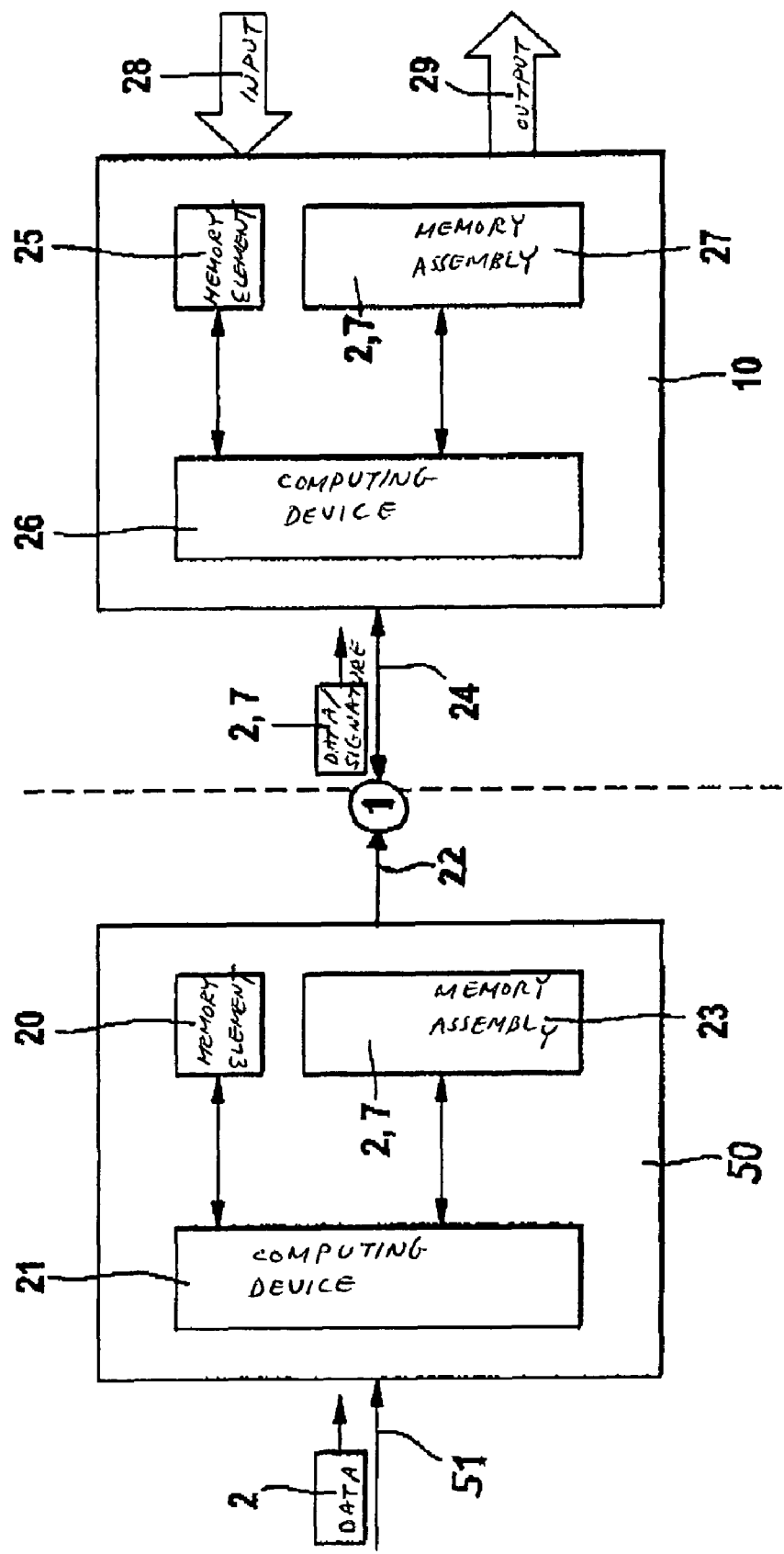
FIG. 2 is a block diagram showing two exemplary microcomputer systems according to the present invention for performing an exemplary method according to the present invention.

FIG. 2 shows further detail of microcomputer system 50 and control device 10 for performing an exemplary method according to the present invention. Programming device 1 is positioned between microcomputer system 50 and control device 10. Programming device 1 is connected to microcomputer system 50 via a first data transmission connection 22 and to control device 10 via a second data transmission connection 24. The data transmitted from microcomputer system 50 to programming device 1 via connection 22 may occur in various ways. The data transmission may be performed, for example, using an electrical, magnetic, or optical memory medium, on which data 2 may be stored. The memory medium may be inserted into a suitable reading device of programming device 1 and the data may be read into programming device 1, where it is stored in a memory assembly 23. Alternatively, the data may be transmitted over a data network, for example, the Internet. In this case, data 2 may be communicated, for example, as an attachment to an electronic message (e-mail) or according to a file transfer protocol (FTP). The data transmission from programming device 1 to control device 10 via connection 24 may also be performed in various ways, for example, by a wired connection, an optical connection, or by a wireless connection. Also, any transmission method may be chosen, using serial or parallel transmission, or according to a particular bus protocol.

Microcomputer system 50 me be a personal computer (PC), for example, and may include a memory element 20, on which a computer program is stored for performing an exemplary method according to the present invention, as shown in the left-hand portion of FIG. 1. Memory element 20, may be, for example, a re-writable memory, for example, a flash memory. The computer program stored in memory element 20 permits data 2 to be reduced to a fingerprint 4 on the basis of the compression algorithm, fingerprint 4 to be encrypted using the encryption algorithm, private key 6 to give signature 7, and data 2 to be transmitted with signature 7 to control device 10. The computer program stored in memory element 20 is processed by a computing device 21, which may be designed, for example, as a microprocessor. Data 2, with which control device 10 is to be programmed, is placed in microcomputer system 50 by the producer of data 2, using an additional data transmission connection 51.

Data 2 is then transmitted with signature 7 from microcomputer system 50 via connection 22, programming device 1, and connection 24 to control device 10 for new programming or reprogramming. Connection 24 is a bi-directional connection, which permits data 2 and signature 7 to be transmitted to control device 10 in one direction and enables feedback concerning the progress of the programming process to be transmitted from control device 10 to programming device 1 in the other direction.

Control device 10 has a memory element 25, in which a computer program is stored for performing at least part of an exemplary method according to the present invention, as shown in the right-hand part of FIG. 1. Memory element 25 may be, for example, a re-writable memory, for example, a flash memory. The computer program stored in memory element 25 may decrypt signature 7 using the decryption algorithm and public key 12, determine reference fingerprint 15 from data 2 using the compression algorithm, compare decrypted fingerprint 13 with reference fingerprint 15, and trigger a switching element 17, in accordance with the result of the comparison.

Control device 10 also includes a computing device 26, which may be designed, for example, as a microprocessor, for processing the computer program stored in memory element 25. Data 2, which is transmitted to control device 10 via data transmission connection 24, and signature 7 are stored in a memory assembly 27 of control device 10. Memory assembly 27 may be a re-writable memory.

Control device 10 controls and/or regulates functions in a motor vehicle, for example, an internal combustion engine, an electronic braking system (brake-by-wire), an electronic steering system (steer-by-wire) or a driving dynamics regulator. Control device 10 receives information concerning the status of the motor vehicle function to be controlled and/or regulated via input signals 28 from sensors or pick-ups (not shown). While executing the control program stored in memory assembly 27 using the parameters and limiting values stored in memory assembly 27, output signals 29 are generated as a function of input signals 28, to trigger actuators and to influence the motor vehicle functions, which are to be controlled and/or regulated.

Figure 3:
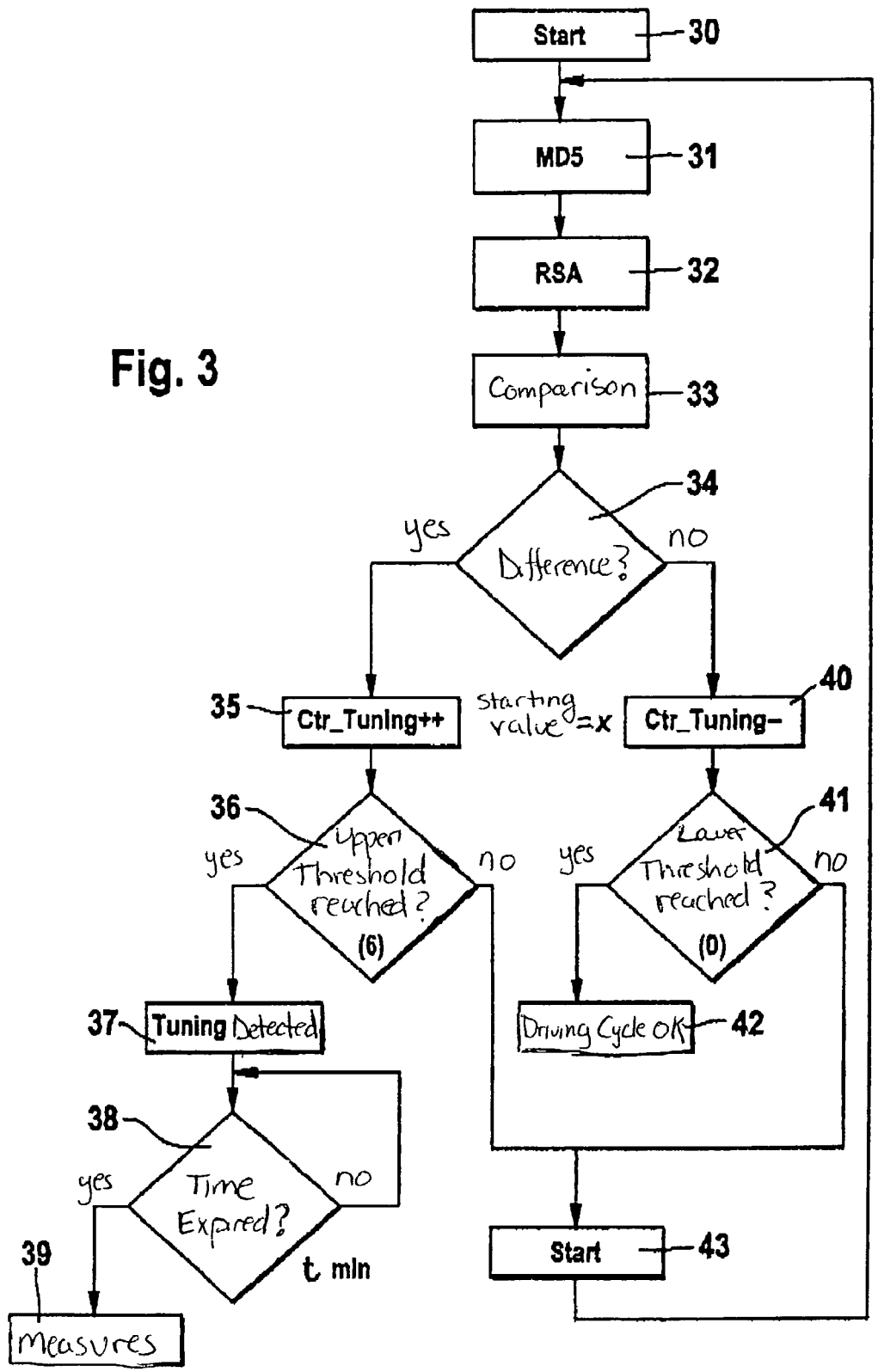
FIG. 3 is a flow chart of part of an exemplary method according to the present invention.

FIG. 3 is a flow chart of a part of an exemplary method according to the present invention that executes in control device 10. The part is executed, while control device 10 is running, that is, during normal operation of the motor vehicle. The method begins in function block 30. In function block 31, reference fingerprint 15 is formed from data 2 or from a predefinable part of data 2 on the basis of the MD5 method. In function block 32, signature 7 is decrypted using the RSA method and decrypted fingerprint 13 is outputted. Decrypted fingerprint 13 and reference fingerprint 15 are then compared with one another in function block 33.

In block 34, a check is performed to determine whether decrypted fingerprint 13 and reference fingerprint 15 differ. If so, data 2 stored in memory assembly 27 is presumed to have been manipulated. In this case, a control variable Ctr_Tuning is incremented by 1 in a function block 35. A positive whole number x is chosen as the starting value for the control variable Ctr_Tuning. In block 36, a check is performed to determine whether an upper threshold value, which is set to 6 in the present exemplary embodiment, has been reached. If so, a manipulation of data 2 stored in memory assembly 27 is detected in a function block 37. A check is then performed in a block 38 in conjunction with an endless loop to determine whether a predefinable period of time t (in the present case several t minutes) has elapsed. If so, function block 39 performs suitable measures, which may include an immediate blocking of the execution of data 2, blocking of data 2 the next time control device 10 starts, or the initiation of a suitable emergency operating mode of control device 10 with predefined data.

If block 34 determines that decrypted fingerprint is the same as reference fingerprint 15, the sequence branches to function block 40, where the control variable Ctr_Tuning is decremented by 1. In block 41, a check is performed to determine whether a lower threshold value, which is set to 0 in the present exemplary embodiment, has been reached. If so, data 2 stored in memory assembly 27 is presumed to be intact, and a normal driving cycle is executed in a function block 42, in which data 2 is processed normally.

If the lower threshold value has not yet been reached, the sequence branches to a function block 43, where the starting values for a new check cycle are set. Branching to function block 43 also occurs from query block 36, if the upper threshold value has not yet been reached. From function block 43, branching then occurs to function block 31, where signature 7 of data 2 is checked in a new check cycle.

The exemplary method according to the present invention described with reference to FIG. 3 is executed until the execution or processing of data 2 is blocked in function block 39, or until execution or use of data 2 is released in function block 42.

What is claimed is:

1. A method of protecting a microcomputer system against manipulation of data block stored in a memory assembly of the microcomputer system, the method comprising the steps of:
   partially marking the data block, wherein a signature of at least part of the data block is formed using an asymmetrical encryption method in conjunction with one of a new programming and a reprogramming of the microcomputer system;
   transmitting the data to the memory assembly;
   checking at least a part of the marked data, wherein the checking of the marked data is performed in the microcomputer system within a framework of processing of the data block in the microcomputer system such that a portion of the data block stored in the memory assembly is checked when the processing of the data block leaves sufficient computing capacity for the checking, whereby the entire data block is checked after a specified period of time; and
   adjusting the operation of the microcomputer system if manipulation of the data block is detected.

2. The method according to claim 1, wherein the partially marking the data block is performed outside of the microcomputer system using a private key and a predefinable encrypting algorithm, the private key being accessible only to a limited group of persons.

3. The method according to claim 2, further comprising the steps of:
  reducing at least part of the data to a fingerprint using a compression algorithm, the reducing being performed outside of the microcomputer system;
  forming a signature from the fingerprint using the private key; and
  transmitting the signature with the data to the microcomputer system.

4. The method according to claim 3, further comprising the steps of:
  decrypting the signature in the microcomputer system using the public key to generate a decrypted fingerprint;
  forming a reference fingerprint from the part of the data reduced to the fingerprint using the compression algorithm, the reference fingerprint being formed using the compression algorithm; and
  comparing the decrypted fingerprint to the reference fingerprint.

5. The method according to claim 3, wherein a hash algorithm is utilized as the compression algorithm to form a hash value.

6. The method according to claim 1, wherein the checking is performed in the microcomputer system using a freely accessible public key.

7. The method according to claim 6, wherein the checking of the marked data is performed in the microcomputer system after one of a new programming and a reprogramming of the memory assembly.

8. The method according to claim 6, wherein the checking of the marked data is performed in the microcomputer system while the microcomputer system powers up.

9. The method according to claim 8, wherein the checking is performed in the microcomputer system in conjunction with a boot routine during power up.

10. The method according to claim 1, wherein an RSA method is utilized as the asymmetrical encryption method.

11. A first non-transitory computer-readable memory medium for storing a plurality of instruction sets for execution in a computing device, the instruction sets performing a method of protecting a microcomputer system against manipulation of data block stored in a second memory assembly of the microcomputer system, the data block being partially marked using an asymmetrical encryption method in conjunction with one of a new programming and a reprogramming of the microcomputer system, the method comprising:
  checking at least a part of the marked data, wherein the checking of the marked data is performed in the microcomputer system within a framework of processing of the data block in the microcomputer system such that a portion of the data block stored in the memory assembly is checked when the processing of the data block leaves sufficient computing capacity for the checking, whereby the entire data block is checked after a specified period of time.

12. The first memory medium according to claim 11, wherein the first memory medium includes one of a read-only memory, a random access memory and a flash memory.

13. The first memory medium according to claim 11, wherein the computing device includes a microprocessor.

14. A microcomputer system, comprising:
  a computing device;
  a memory assembly storing a data block, wherein the data block is partially marked using an asymmetrical encryption method in conjunction with one of a new programming and a reprogramming of the microcomputer system;
  a memory element storing a computer program, wherein the computer program performs, when executed by the computing device, the following: checking at least a part of the marked data, wherein the checking of the marked data is performed in the microcomputer system within a framework of processing of the data block in the microcomputer system such that a portion of the data block stored in the memory assembly is checked when the processing of the data block leaves sufficient computing capacity for the checking, whereby the entire data block is checked after a specified period of time.

15. The microcomputer system according to claim 14, wherein the microcomputer system is configured as a controller for operation of a motor vehicle.

* * * * *